United States Patent [19]

Owashi et al.

[11] Patent Number: 5,537,181
[45] Date of Patent: Jul. 16, 1996

[54] CAMERA WITH AN EYE-GAZE POSITION DETECTING DEVICE

[75] Inventors: Masao Owashi, Kawasaki; Shigemasa Sato, Yokohama; Toshimi Watanabe, Machida; Kenji Tazaki, Funabashi, all of Japan

[73] Assignee: Nikon Corporation, Tokyo, Japan

[21] Appl. No.: 236,256

[22] Filed: May 2, 1994

Related U.S. Application Data

[63] Continuation of Ser. No. 10,991, Jan. 29, 1993, abandoned.

[30] Foreign Application Priority Data

Feb. 28, 1992 [JP] Japan ..................................... 4-043360

[51] Int. Cl.⁶ ....................................................... G03B 7/00
[52] U.S. Cl. .............................. 354/410; 354/62; 354/219
[58] Field of Search .............................. 354/62, 410, 430, 354/219, 195.1, 402, 400, 484

[56] References Cited

U.S. PATENT DOCUMENTS

| | | | |
|---|---|---|---|
| 4,574,314 | 3/1986 | Weinblatt | 354/400 |
| 5,036,347 | 7/1991 | Tsunekawa et al. | 354/219 |
| 5,136,327 | 8/1992 | Ogawa | 354/484 |
| 5,182,443 | 1/1993 | Suda et al. | 354/219 |
| 5,200,774 | 4/1993 | Nakajima | 354/62 |
| 5,214,466 | 5/1993 | Nagano et al. | 354/219 |
| 5,239,337 | 8/1993 | Takagi et al. | 354/219 |
| 5,245,371 | 9/1993 | Nagano et al. | 354/219 |
| 5,245,381 | 9/1993 | Takagi et al. | 354/219 |
| 5,331,365 | 7/1994 | Miyazawa et al. | 354/410 |

FOREIGN PATENT DOCUMENTS 2-32312  2/1990  Japan .

Primary Examiner—Russell E. Adams

[57] ABSTRACT

A camera device comprises an eye-gaze position detecting for detecting a photographer's eye-gaze position in a photographing image field, a starting device responsive to the satisfaction of a predetermined condition indicative of a situation in which the detection of the eye-gaze position should be started to start the operation of the eye-gaze position detecting device, a timer device responsive to the counting of a predetermined time from after the power source of the camera is turned on to stop the operation of the eye-gaze position detecting device, a timer resetting device responsive to the satisfaction of the predetermined condition to initialize the time counting by the timer device.

9 Claims, 5 Drawing Sheets

5,537,181

CAMERA WITH AN EYE-GAZE POSITION DETECTING DEVICE

This is a continuation of application Ser. No. 08/010,991 filed Jan. 29, 1993, now abandoned.

BACKGROUND OF THE INVENTION

1. Field of the Invention

This invention relates to a camera with an eye-gaze position detecting device for detecting the position of an object being watched in a photographing image field by a photographer.

2. Related Background Art

A camera with an eye-gaze position detecting device for detecting a photographer's eye-gaze position as an object position and effecting focusing control and exposure control is disclosed, for example, in Japanese Laid-Open Patent Application No. 2-32312.

FIG. 7 of the accompanying drawings shows a flow chart of the camera with an eye-gaze position detecting device disclosed in this publication, and in this camera with an eye-gaze position detecting device when a power source is first turned on at a step 801, the eye-gaze position detecting device is energized at a step 802.

At a step 803, whether the half push switch SW1 of a release button is closed is judged, and if it is not closed, return is made to the step 802.

If the half push switch SW1 is closed, at a step 804, the eye-gaze position is locked at a predetermined focus detection area, and at a step 805, a photo-taking lens is operated so as to be focused on an object in this focus detection area.

Thereafter, at a step 806, whether the half push switch SW1 of the release button is closed is judged, and if it is not closed, return is made to the step 802.

If the half push switch SW1 is closed, at a step 807, whether the full push switch SW2 of the release button is closed is judged, and if it is not closed, this judgment is repeated until it is closed.

If the full push switch SW2 is closed, a predetermined release operation is performed at a step 808.

In such a prior-art camera with an eye-gaze position detecting device, the eye-gaze position detecting device is energized upon turning-on of the power source of the camera and for example, an infrared light emitting LED is caused to emit light, and this has led to the problem that the life of a battery and the life of the infrared light emitting LED become short.

Also, in the prior-art camera with an eye-gaze position detecting device, the eye-gaze position is locked by the closing of the half push switch SW1 of the release button and the operation of the eye-gaze position detecting device is stopped, and this has led to the problem that the responsiveness of the eye-gaze position detecting device immediately after the unlocking of the eye-gaze position is reduced.

SUMMARY OF THE INVENTION

It is the object of the present invention to provide a camera with an eye-gaze position detecting device which can automatically effect eye-gaze position detection only when eye-gaze position detection is necessary and in which the responsiveness of the eye-gaze position detecting device can be improved.

DESCRIPTION OF THE PREFERRED EMBODIMENTS

An embodiment of the present invention will hereinafter be described in detail with reference to the drawings.

Figure 1:
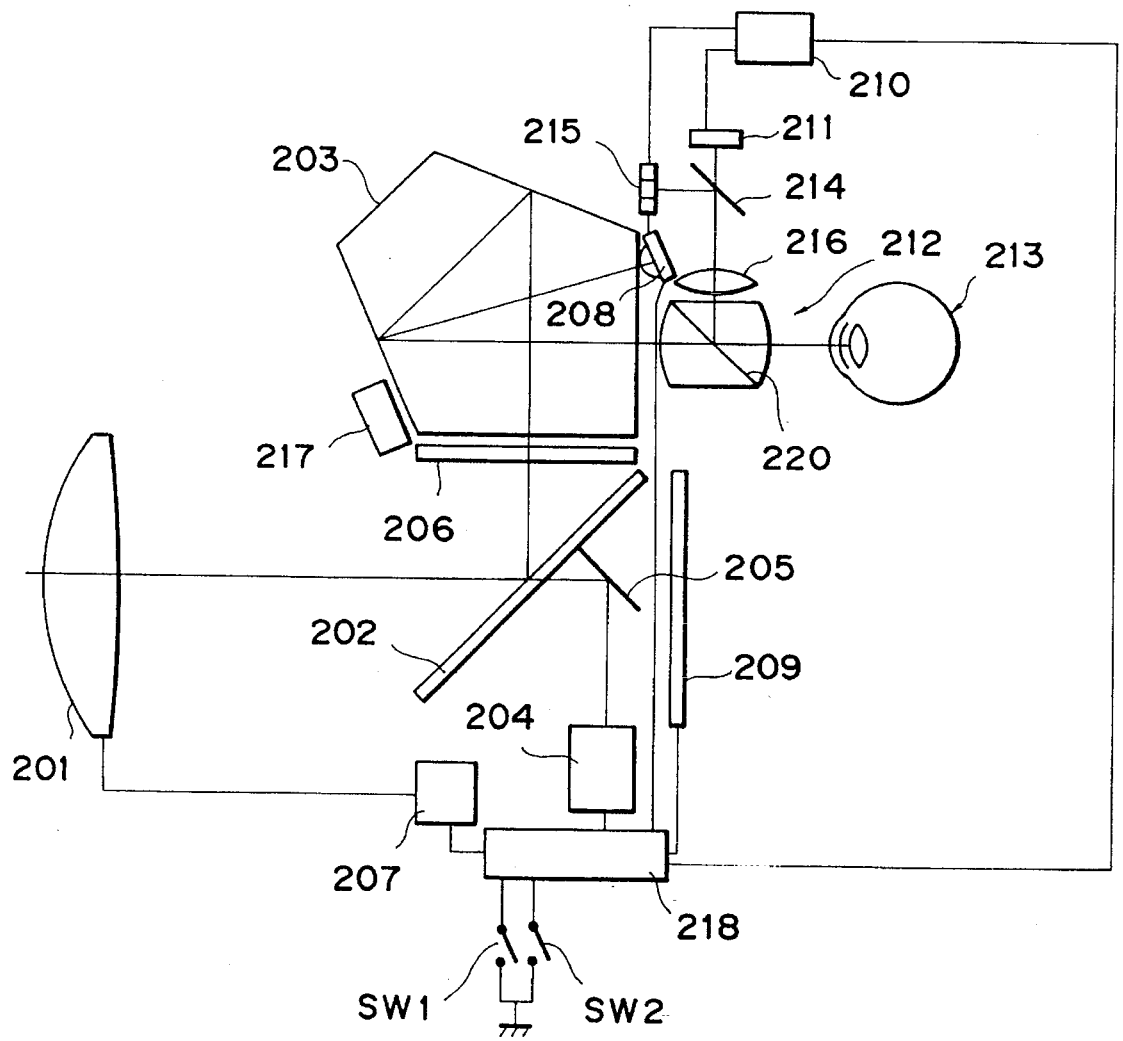
FIG. 1 is an illustration showing an embodiment of a camera with an eye-gaze position detecting device according to the present invention.

FIG. 1 shows an embodiment of a camera with an eye-gaze position detecting device according to the present invention. In this camera with an eye-gaze position detecting device, object light passed through a photo-taking lens 201 is divided to a finder 203 side and a focus detecting circuit (hereinafter referred to as the AF circuit) 204 side by a main mirror 202, and the light to the AF circuit 204 side has its optical path further bent by a sub-mirror 205 and is directed to the AF circuit 204.

On the other hand, the light directed to the finder 203 side by the main mirror 202 forms an object image on a screen 206.

The AF circuit 204 is a conventional automatic focus adjusting circuit and has a plurality of focus detection areas, and on the basis of the focused state of the lens detected therein, the photo-taking lens 201 is driven by a lens driving circuit 207.

A light metering circuit (hereinafter referred to as the AE circuit) 208 effects photometry output weighted-averaged on the basis of an eye-gaze position.

A release circuit 209 starts the shutter release operation by the closing of a full push switch SW2.

An eye-gaze position detecting circuit 210 is incorporated in the finder 203.

This eye-gaze position detecting circuit 210 causes an infrared light emitting LED 211 to emit infrared light, and this infrared light is made into parallel light by an optical system 212 and is projected onto the cornea of the photographer's eye 213.

The optical system 212 is comprised of a half mirror 214 for separating projected light and reflected light from each other, a lens 216 for imaging the reflected light on a sensor 215, a dichroic mirror 220 for separating the projected light and reflected light from the light from the finder 203, etc.

The eye-gaze position detecting circuit 210 detects the eye-gaze position in the photographing image field by conventional means using "Purkinje's 1st image and Purkinje's 4th image", "Purkinje's 1st image and the center of pupil", "the boundary between the white and iris of the eye", etc.

A display circuit 217 selects and displays the focus detection area nearest to the eye-gaze position detected by the eye-gaze position detecting circuit 210, and displays control modes such as automatic focus adjustment and automatic exposure.

A CPU 218 controls the AF circuit 204, the AE circuit 208, the release circuit 209, the eye-gaze position detecting circuit 210, etc.

The principle of eye-gaze position detection will hereinafter be briefly described with reference to FIGS. 2A to 2C and FIG. 3.

The above-described optical system 212 for eye-gaze position detection uses the optical system of the finder 203 in common. In the eye-gaze position detecting circuit 210, four calescence points can be seen by the optical system 213 in the eye, and these calescence points are detected by a sensor 215 comprising a light receiving element such as a two-dimensional CCD.

These calescence points are reflected light from the surface of the cornea to the back of the crystal lens, and are called Purkinje's images, i.e., 1st, 2nd, 3rd and 4th images from the surface of the cornea.

In this embodiment, the eye-gaze position is detected by the use of Purkinje's 1st image and Purkinje's 4th image.

Figure 2A:
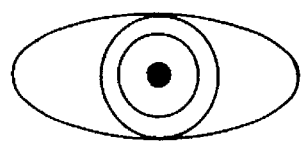
FIGS. 2A to 2C show the principle of eye-gaze position detection.
Figure 2B:
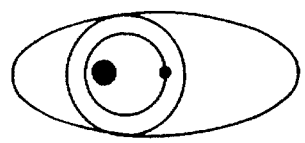
Figure 2C:
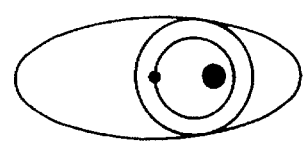

Purkinje's 1st and 4th images look like FIGS. 2A to 2C, and when the eye sees the center (FIG. 2A), the 1st and 4th images overlap each other, but by the eye seeing right or left, they look separate from each other as shown in FIG. 2B or 2C.

Figure 3:
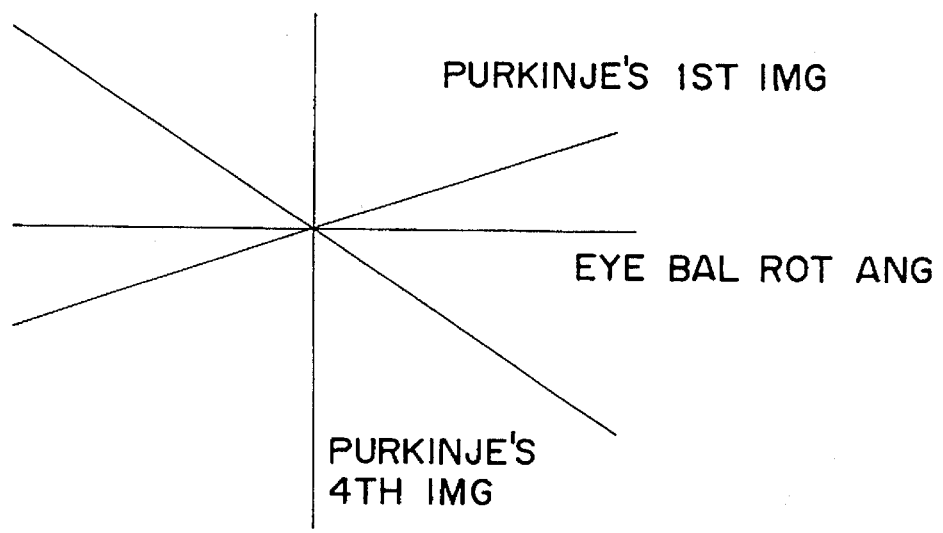
FIG. 3 shows the relation between Purkinje's images and the amount of relative movement of the center of pupil.

The amounts of movement of these Purkinje's 1st and 4th images, if shown by pupil center coordinates, are as shown in FIG. 3.

These amounts of movement, in case of angles of rotation of the order of ±30°, vary substantially linearly relative to the angle of rotation and thus, if these amounts of movement can be measured, the angle of rotation of the eyeball becomes known, and in this embodiment, the centroid position of each calescence point is found by the sensor 215 and the angle of rotation of the eyeball is found from the relation of FIG. 3.

Figure 4:
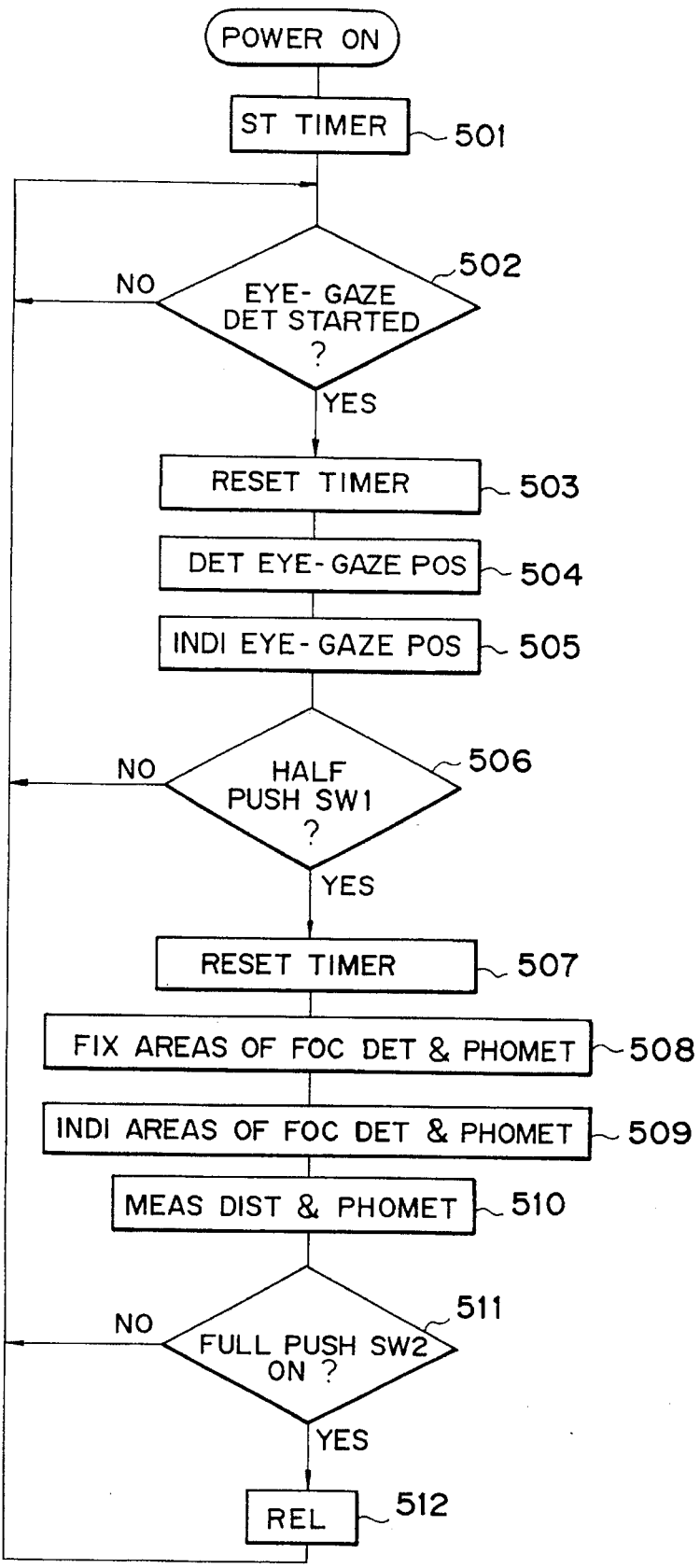
FIG. 4 is a chart showing the flow of the camera with an eye-gaze position detecting device shown in FIG. 1.

FIG. 4 is a flow chart showing the operations from the turning-on of the power source during photographing by the above-described camera with an eye-gaze position detecting device to the release operation, and the flow is started by the turning-on of the power source. In this embodiment, the control of the program is effected by the CPU 218.

First, at a step 501, a timer is started by the turning-on of the power source of the camera, and the power source is turned off after a predetermined time. Also, this timer is initialized by a reset signal which will be described later.

At a step 502, whether eye-gaze detection should be started is judged on the basis of a predetermined judgment condition. If the judgment condition is established, advance is made to a step 503, and if the judgment condition is not established, whether eye-gaze detection should be started is judged as long as the power source is turned on.

The predetermined judgment condition is whether the photographer's eye is in contact with the finder, and when the photographer's eye is in contact with the finder, it is judged that eye-gaze position detection should be started.

The detection of whether the photographer's eye is in contact with the finder is possible by detecting it by providing in the finder portion an outdoor daylight type passive AF heretofore used, or providing a touch sensor on the eye contact portion of an eyepiece.

In another embodiment, the predetermined judgment condition is whether the preparation for photographing has been completed, and when the preparation for photographing has been completed, it is judged that eye-gaze position detection should be started. The completion of the preparation for photographing is accomplished by detecting the presence or absence of film by the utilization of DX code, detecting the winding by shutter charge, and detecting the mounting of a photo-taking lens by the signals of the lens and body. The detecting means for detecting eye contact may be another method if the purpose can be achieved thereby.

In still another embodiment the predetermined judgment condition is whether the photographer is in touch with the release button, and when the photographer is in touch with the release button, it is judged that eye-gaze position detection should be started. Whether the photographer is in touch with the release button can be detected, for example, by providing a touch sensor on the release button.

At a step 503, the timer of the power source is reset (initialized). The counting by the timer is then started. Here, the timer for turning off the power source after the lapse of e.g. 8 to several tens of seconds is started. This timer starts its operation also by the turning-off of the power source of the camera or the half depression of the release button, and turns off the power source after the lapse of the aforementioned predetermined time.

At a step 504, the photographer's eye-gaze position in the photographing image field is detected by the eye-gaze position detecting circuit 210 by the use of the aforedescribed Purkinje's 1st image and Purkinje's 4th image.

The angle of rotation of the eyeball can be detected by Purkinje's 1st image alone, but this Purkinje's 1st image is moved also by the parallel movement of the eyeball and therefore, it provides a great error generally in the finder of a camera which is great in the degree of freedom of the eye. Thus, the design is made such that the amount of this parallel movement is cancelled by the use of Purkinje's 4th image.

When the eye-gaze position of discrete two or three points is to be measured, Purkinje's 4th image need not always be used together.

At a step 505, the eye-gaze position detected by the eye-gaze position detecting circuit 210 at the step 504 is indicated in the finder of the camera.

Figure 5:
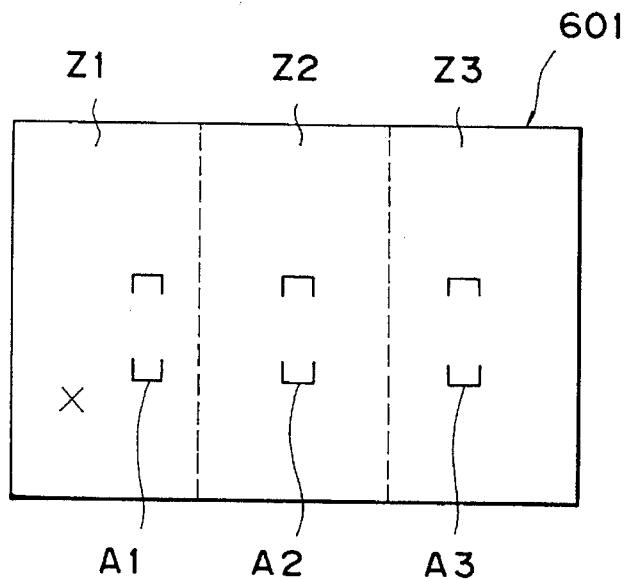
FIG. 5 is an illustration showing the focus detection areas of a finder.

In this embodiment, as shown in FIG. 5, the current eye-gaze position detected at the step 504 is indicated by a mark X in the finder 601 of the camera.

At a step 506, whether the half push switch SW1 is pushed is judged, and if it is pushed, advance is made to a step 507, and if it is not pushed, return is made to the step 502.

At a step 507, the aforedescribed timer is again reset.

At a step 508, in which of judgment areas (Z1, Z2, Z3) the eye-gaze position (the mark X) being detected by the eye-gaze position detecting circuit 210 exists is judged, and when it is detected that the eye-gaze position exists in the judgment area Z1 as shown in FIG. 5, a focus detection area and a light metering area corresponding to the judgment area Z1 are fixed.

Figure 6:
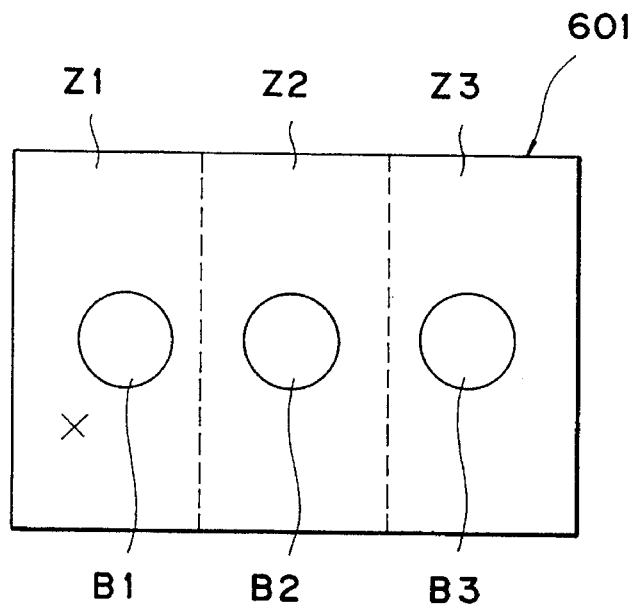
FIG. 6 is an illustration showing the light metering areas of the finder.
Figure 7:
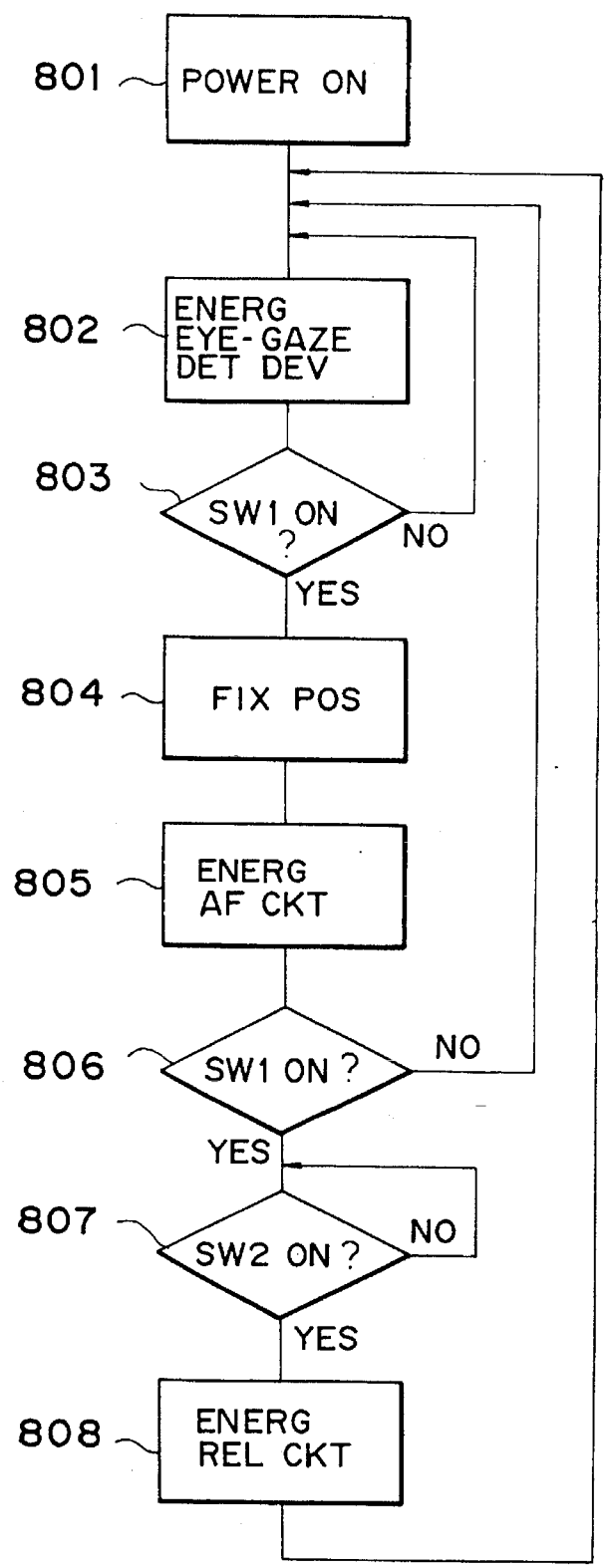
FIG. 7 is a chart showing the flow of a camera with an eye-gaze position detecting device according to the prior art.

Specifically, among focus detection areas (A1, A2, A3) shown in FIG. 5 and among light metering areas ( B1, B2, B3 ) shown in FIG. 6, the focus detection area A1 and the light metering area B1 are fixed. In the focus detection area A1 and the light metering area B1, respective detections are effected.

In this embodiment, continuous focus detection areas and light metering areas are shown, but alternatively, discrete focus detection areas and light metering areas may be used.

At a step 509, the focus detection area and light metering area fixed at the step 508 are indicated, for example, by the turn-on-and-off of the focus detection area and light metering area or by changing the color thereof.

At a step 510, the lens is driven on the basis of the focus detection information of the focus detection area fixed at the step 508, for example, the focus detection area A1, and automatic focus detection is effected. Likewise, automatic exposure control is effected by the weighted averaging having the light metering area fixed at the step 508, for example, the light metering area B1, as the centroid.

At a step 511, whether the release switch SW2 is pushed is judged, and if it is pushed, advance is made to a step 512, where release is effected, and if it is not pushed, return is made to the step 502.

At the step 512, a series of release operations such as mirror up, shutter movement, mirror down, film feeding and shutter charge are performed. When the release operations are terminated, return is made to the step 502. Thereafter, this routine is executed until the power source is turned off.

In the camera with an eye-gaze position detecting device constructed as described above, when the power source is turned on, whether eye-gaze position detection should be started is judged on the basis of the predetermined judgment condition, and only when it is judged that eye-gaze position detection should be started, the eye-gaze position detecting circuit 210 is operated and therefore, only when eye-gaze position detection is necessary, it becomes readily possible to automatically effect eye-gaze position detection.

Accordingly, it never happens that as in the prior art, the infrared light emitting LED emits light when the photographer is not looking into the finder 601 or when the phototaking lens is not mounted on the camera, and thus, the life of the battery and the life of the infrared light emitting LED can be more greatly increased than in the prior art.

Also, when it is judged that eye-gaze position detection should not be started, the timer is started and after the lapse of a predetermined time, the power source is automatically turned off and therefore, it becomes possible to increase the life of the battery.

Further, in the camera with an eye-gaze position detecting device constructed as described above, only the focus detection areas are fixed by the closing of the half push switch SW1 and the eye-gaze position of the eye-gaze position detecting circuit 210 is not locked and the operation of the eye-gaze position detecting circuit 210 is not stopped and therefore, the responsiveness of the eye-gaze position detecting device can be improved.

Also, design is made such that the indication of the current eye-gaze position is effected even when the fixing of the focus detection areas is being effected and therefore, the photographer can know his eye-gaze position at all times.

As described above, in the camera with an eye-gaze position detecting device as defined in the invention, whether eye-gaze position detection should be started is judged on the basis of the predetermined judgment condition, and when it is judged that eye-gaze position detection should be started, the eye-gaze position detecting device is operated and further, when it is judged that eye-gaze position detection should not be started, the timer is started and after the lapse of a predetermined time, the power source is turned off and therefore, eye-gaze position detection can be automatically effected only when it is necessary.

When the release button is half-depressed, the focus detection or light metering areas are fixed, and at this time also, the operation of the eye-gaze position detecting device is continued and therefore, the responsiveness of the eye-gaze position detecting device immediately after the fixing of the areas is released can be improved.

Also, in the camera with an eye-gaze position detecting device as defined in the invention, even when the fixing of the focus detection areas is being effected, the indication of the current eye-gaze position is effected, and this leads to the advantage that the photographer can always know his current eye-gaze position.

What is claimed is:

1. A camera, comprising:
    an eye-gaze position detector detecting a photographer's eye-gaze position in a photographing image field to bring about camera operations such as automatic focusing based on said photographer's eye-gaze position;
    a starter responsive to the satisfaction of a predetermined condition in which the detection of the photographer's eye-gaze position should be started, and starting the operation of said eye-gaze position detector;
    a timer which is started when a power source of the camera is turned on and which is responsive to the counting of a predetermined time to stop the operation of said eye-gaze position detector; and
    a timer reset unit responsive to the satisfaction of said predetermined condition to restart the time counting by said timer.

2. A camera, comprising:
    an eye-gaze position detector detecting a photographer's eye-gaze position in a photographing image field to bring about camera operations such as automatic focusing based on said photographer's eye-gaze position;
    a starter responsive to the satisfaction of a predetermined condition in which the detection of the eye-gaze position should be started, and starting the operation of said eye-gaze position detector;
    a timer which is started when a power source of the camera is turned on and which is responsive to the counting of a predetermined time to stop the operation of said eye-gaze position detector; and
    a timer reset unit responsive to the satisfaction of said predetermined condition to restart time counting by restarting said timer; and
    an area defining unit defining a predetermined area with respect to the eye-gaze position detected by said eye-gaze position detector at a point of time when a release button of the camera is half-depressed;
    said eye-gaze position detector continuing to operate until the operation thereof is stopped by said timer after said predetermined area is defined.

3. A camera according to claim 2, further comprising:
    an indicator indicating said predetermined area.

4. A camera according to claim 2, further comprising:
    an indicator indicating said predetermined area and the current eye-gaze position.

5. A camera according to claim 2, wherein said predetermined area is a focus detection area.

6. A camera according to claim 2, wherein said predetermined area is a light metering area.

7. A camera according to claim 2, wherein said predetermined condition is that the photographer's eye is positioned at a finder of the camera.

8. A camera according to claim 2, wherein said predetermined condition is that preparation for photographing is completed.

9. A camera according to claim 2, wherein said predetermined condition is that the photographer is operating a release button.

* * * * *

UNITED STATES PATENT AND TRADEMARK OFFICE
CERTIFICATE OF CORRECTION

PATENT NO. : 5,537,181
DATED : July 16, 1996
INVENTOR(S) : Masao OWASHI et al.

It is certified that error appears in the above-indentified patent and that said Letters Patent is hereby corrected as shown below:

Title page item [57],
    line 1, after "camera" delete "device";
    line 1, after "detecting" insert --device--.

Signed and Sealed this

Seventh Day of January, 1997

Attest:

BRUCE LEHMAN

*Attesting Officer*      *Commissioner of Patents and Trademarks*